United States Patent [19]

Wolcott

[11] Patent Number: 4,688,104
[45] Date of Patent: Aug. 18, 1987

[54] APPARATUS FOR PRODUCING A FULL RESOLUTION COLOR PHOTOGRAPHIC COPY OF A COLOR VIDEO SIGNAL

[75] Inventor: Dana W. Wolcott, Rochester, N.Y.

[73] Assignee: Eastman Kodak Company, Rochester, N.Y.

[21] Appl. No.: 776,232

[22] Filed: Sep. 16, 1985

[51] Int. Cl.[4] .......................... H04N 9/81; H04N 5/84
[52] U.S. Cl. .................................... 358/332; 358/244; 358/76
[58] Field of Search .................. 358/244, 244.1, 244.2, 358/332, 76, 77, 78, 79, 80, 345

[56] References Cited

U.S. PATENT DOCUMENTS

| | | | |
|---|---|---|---|
| 2,251,786 | 8/1941 | Epstein | 178/6.7 |
| 2,296,019 | 9/1942 | Camarena | 178/5.4 |
| 2,530,107 | 11/1950 | Webb | 178/5.4 |
| 2,600,868 | 6/1952 | Hales | 178/5.4 |
| 2,618,701 | 11/1952 | Christensen | 178/5.4 |
| 2,738,377 | 3/1956 | Weighton | 178/5.2 |
| 2,878,309 | 3/1959 | Christensen | 178/5.4 |
| 2,995,619 | 8/1961 | Freeman | 178/5.2 |
| 3,006,260 | 10/1961 | Smith et al. | 95/12 |
| 4,197,559 | 4/1980 | Gramling | 358/58 |
| 4,231,061 | 10/1980 | Freeman | 358/76 |
| 4,339,769 | 7/1982 | Fujita et al. | 358/6 |
| 4,373,156 | 2/1983 | Pfannkuch et al. | 340/703 |
| 4,438,453 | 3/1984 | Alston | 358/78 |
| 4,468,693 | 8/1984 | Fujita et al. | 358/78 |
| 4,473,849 | 9/1984 | Cool | 358/332 |
| 4,496,955 | 1/1985 | Maeyama et al. | 346/76 |

OTHER PUBLICATIONS

Patent Abstracts of Japan, vol. 6, No. 41 (p.–106) (919) Mar. 13, 1982.
Neuhäuser, "Farb-Hardcopy-Farbecht VND Verzerrungsfrei", Elektronik, vol. 30, No. 19, 9/81.

Primary Examiner—Raymond F. Cardillo
Assistant Examiner—Robert A. Weinhardt
Attorney, Agent, or Firm—William F. Noval

[57] ABSTRACT

A color video printer for producing a color photographic copy from a color video signal. The printer includes a monochrome cathode ray tube (CRT) and an exposure station located along an optical path from the CRT. The printer includes a rotatable filter wheel having red, green and blue filters sequentially movable into the optical path in synchronism with the field frequency of the color video signal to filter monochrome images produced by the CRT. A video signal circuit provides a color video signal including three concurrent red, green and blue component video signals repeated at broadcast field frequency. A gate is electrically connected between the video signal circuit and the CRT to selectively apply, when actuated, one of the three concurrent color component video signals to the CRT. An unexposed self-processing photographic element positioned at the exposure station is exposed to a sequence of six color field images constituting a full frame of a color video signal having odd and even fields of each of the red, green and blue colors.

8 Claims, 7 Drawing Figures

APPARATUS FOR PRODUCING A FULL RESOLUTION COLOR PHOTOGRAPHIC COPY OF A COLOR VIDEO SIGNAL

CROSS REFERENCE TO RELATED APPLICATIONS

U.S. patent application Ser. No. 776,234, entitled MICROPROCESSOR CONTROL FOR A COLOR VIDEO PRINTER, by Harold J. Barrett filed Sept. 16, 1985, U.S. patent application Ser. No. 776,233, entitled COLOR VIEWER FOR A COLOR VIDEO PRINTER, by Dana W. Wolcott, filed Sept. 16, 1985 U.S. patent application Ser. No. 776,236, entitled WHITE COMPENSATION CIRCUIT FOR A COLOR VIDEO PRINTER, by Douglas W. Constable, filed Sept. 16, 1985 and U.S. patent application Ser. No. 776,231, entitled VIDEO SIGNAL PROCESSING CIRCUIT FOR A COLOR VIDEO PRINTER, by Douglas W. Constable, filed Sept. 16, 1985.

BACKGROUND OF THE INVENTION

This invention relates in general to video signal apparatus and in particular, to a color video printer for producing a color photographic copy from a color video signal.

It is often desirable to make a color photographic print of an image displayed on a color video monitor. One technique is to use a still camera to take a photograph directly of the screen of the video monitor. However, this technique can produce a poor quality copy due to the difficulty in synchronizing the shutter speed of the still camera with the frame rate of the video signal. Moreover, it is difficult to position the still camera relative to the monitor screen in order to make the photographic image coincide with the monitor image. Another technique which has been proposed (see, e.g., U.S. Pat. Nos. 4,438,453 and 4,473,849) is to divide the color video signal into red, blue and green component video signals and to sequentially display images of the respective component signals on a monochrome monitor. The screen of the monitor is photographed through stationary color filters corresponding to the color component signals applied to the monitor. The exposure time in this technique is long since color film is exposed to several frames of each color component signal. This technique is time consuming and is not readily applicable to the copying of a moving video scene.

Several sophisticated techniques have been disclosed (see, e.g., U.S. Pat. Nos. 4,373,156; 4,339,769; and 4,468,693) in which a frame store is utilized to capture a frame of a color video signal. A color print is made by sequentially exposing color photographic material to timed exposures of sequential color images of the captured frame. These systems are disadvantageous in their size, structural and circuit complexity and high cost. Other proposed printing techniques have also proved unsatisfactory. Thus, techniques requiring chemical processing of exposed photographic material (e.g. U.S. Pat. No. 3,006,260) or thermal transfer of print material from transfer paper to copy paper (e.g., U.S. Pat. No. 4,496,955), necessitate replenishment of toxic chemicals or handling of messy transfer materials. Furthermore, techniques which require special purpose printing tubes (e.g., U.S. Pat. Nos. 4,231,061 and 2,995,619) are costly and complex.

A relevant technique is disclosed in U.S. Pat. No. 2,878,309 relating to the field sequential color broadcast system which was briefly authorized as the United States Color Broadcast Standard during the early 1950's. In the disclosed system, a color television signal comprising a sequence of red (R), green (G), and blue (B) field video signals is applied to a monochrome television tube which is reviewed through a rotating RGB filter wheel as a color image. A frame of color motion picture film is exposed to a sequence of six fields to produce a full resolution motion picture image of the video signal. It would be difficult, however, to use such a system in making a color copy of a present day standard composite color video signal since no means is disclosed for selecting a single component color video signal from three concurrent color component video signals. Moreover, the motion picture film had to be subsequently processed after all of the frames have been exposed so that a frame was not available for immediate viewing.

Thus, there exists a need for a simple, economical and easy to use color video printer for producing a color photographic copy of a color video signal.

SUMMARY OF THE INVENTION

According to an aspect of the present invention, there is provided a compact, economical and easy to use color video printer which includes a monochrome display device (such as a monochrome cathode ray tube (CRT)), an exposure station located along an optical path from the imaging device and a color filter wheel having first, second and third primary color filters sequentially movable into the optical path in synchronism with the field frequency of the color video signal. The use of a monochrome CRT and color filter obviates the need for costly color CRT's and costly and complex special purpose printing devices.

According to another aspect of the present invention, the disadvantages of using processing chemicals and heat transfer materials is obviated through the exposure of self-processing photographic elements at the exposure station.

According to a further aspect of the present invention, a full resolution color copy of a color video signal is provided in a short exposure time by exposing a photographic element to a sequence of six color field images constituting a full frame of a color video signal having odd and even fields of each of the three primary colors. The short exposure time permits the copying of relatively static moving video scenes with surprisingly good image quality.

DESCRIPTION OF THE DRAWINGS

In the detailed description of the invention presented below, reference is made to the accompanying drawings in which like elements are numbered with like numbers.

DESCRIPTION OF THE PREFERRED EMBODIMENT

In the following description of a preferred embodiment of the color video printer of the present invention, the printer will be described with respect to the processing of an NTSC color video signal which is the standard broadcast signal in the United States, Canada, Japan and other countries. It will be understood that the printer of the present invention may also be used with other broadcast standards such as the PAL and SECAM systems used in Europe and other parts of the world. In the NTSC system, a single color image is represented by a color video signal constituting a frame of two interlaced odd and even fields. Each color field signal includes luminance and chrominace components which encode three concurrent primary color component signals (red, green and blue). The color video signal is broadcast at 30 frames or 60 fields per second.

Figure 1:
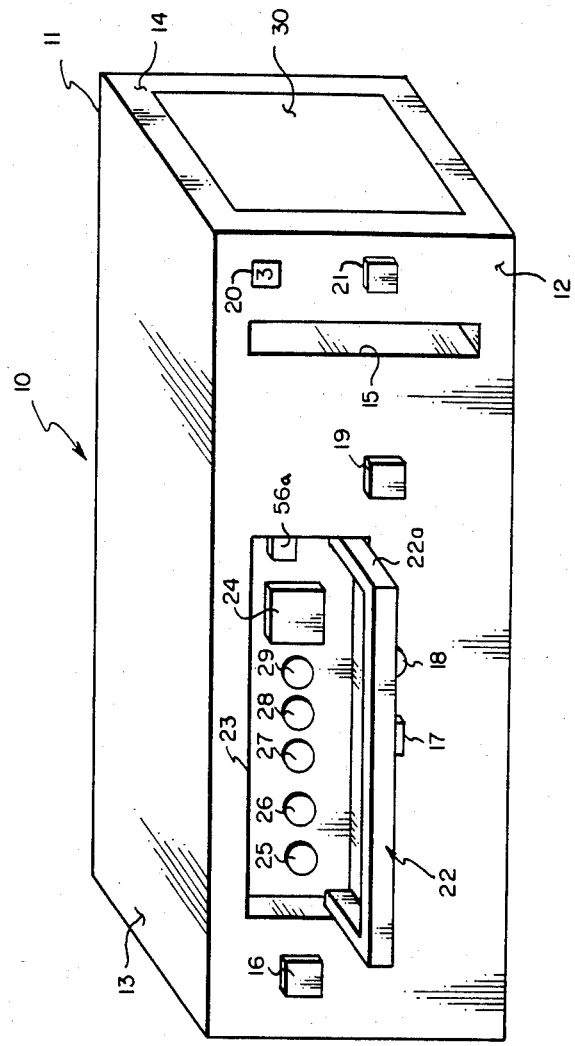
FIG. 1 is a perspective view of a color video printer according to the present invention.

Referring now to the figures, there is shown a preferred embodiment of the color video printer according to the present invention. In FIG. 1, printer 10 includes a housing 11 having a front panel 12, a top panel 13, and a side panel 14 with a door 30 for inserting packs of self-processing photographic elements into printer 10. Not shown are another side panel, a bottom panel and a rear panel. Front panel 12 includes a print ejection slot 15, a "POWER" switch 16, a "PRINT" switch 17, a "READY" light 18, an "NTSC/RGB" switch 19, an "EXPOSURE NUMBER" dial 20 and a latch 21. A cover 22 with lip 22a is mounted on panel 12 and is movable between an open position (as shown in FIG. 1) and a closed position. When cover 22 is in the open position, a recessed panel 23 is accessible to an operator for viewing and adjusting an image. Panel 23 includes an image viewer 24 and adjustable controls 25, 26, 27, 28 and 29 (to be explained later).

Figure 2:
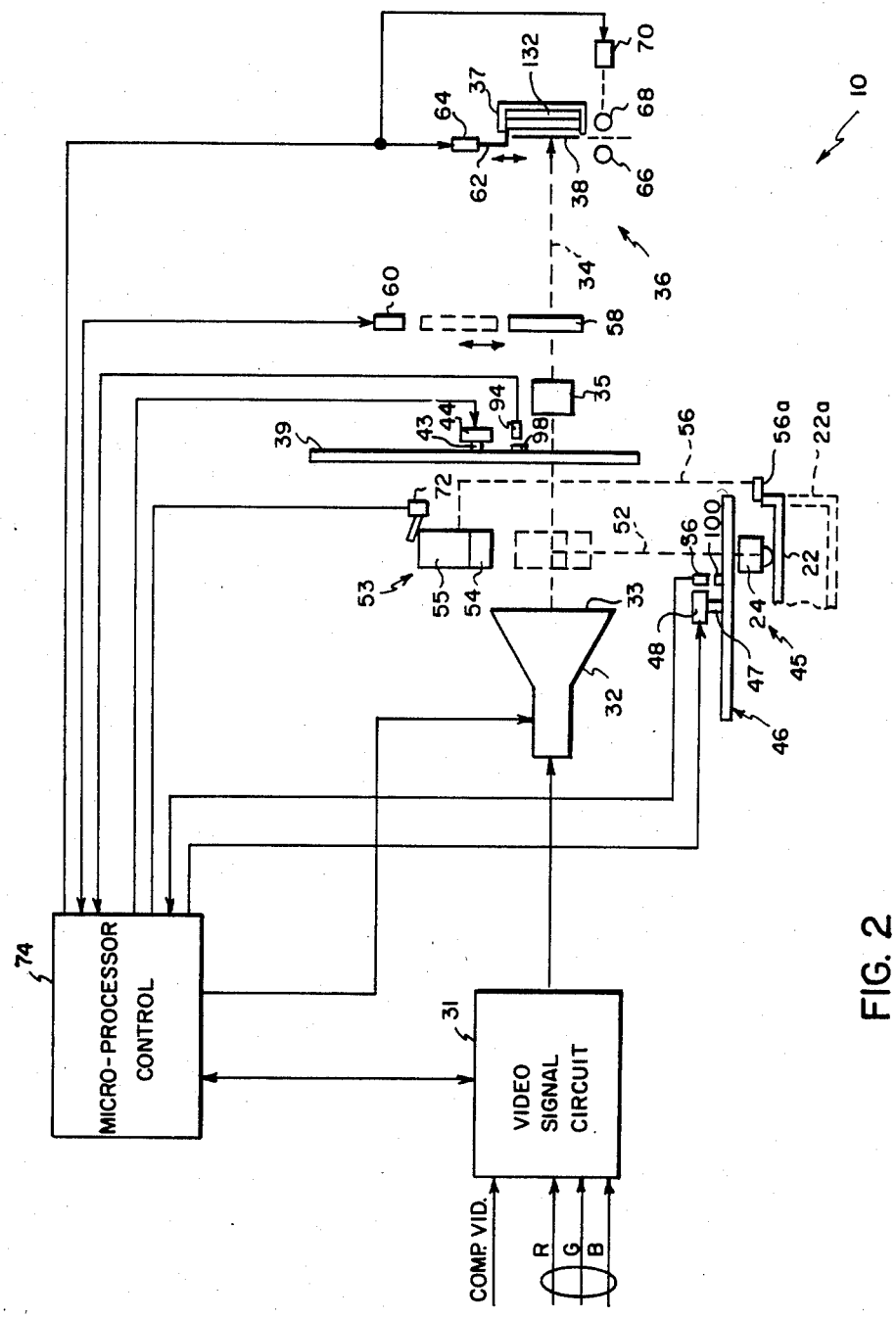
FIG. 2 is a partially schematic, partially diagrammatic view of the printer of FIG. 1.

Referring now to FIG. 2, there is shown a partially schematic, partially diagrammatic view of important components of printer 10. As shown, printer 10 includes a video signal circuit 31 which receives (by actuation of switch 19 on panel 12 in FIG. 1) either a composite color video signal having luminance and chrominance component video signals or an RGB component color video signal having three concurrent primary color signals constituting red (R), green (G), and blue (B) component video signals. The composite color video signal is illustratively described as being in the NTSC format which has a field frequency of sixty fields per second, or a frame frequency of thirty frames per second. The color video signal may be provided by a transmission source, such as broadcast, cable or satellite transmission; by a recording device such as a video cassette recorder/player, a magnetic disc player or an optical disc player; or by a program source such as a video camera.

As will be explained in greater detail with respect to FIG. 3, video signal circuit 31 processes either a composite color video signal or an RGB component color video signal to provide a repetitive sequence of RGB primary color component video signals to a monochrome electronic display device such as a monochrome cathode ray tube (CRT) 32. The applied video signal is converted to a monochrome optical image which is displayed on the screen 33 of CRT 32. An exposure station 36 is located along a first (exposure) optical path 34 from CRT 32. Positioned at station 36 is a pack 37 of unexposed self-processing photographic elements 38.

A first (exposure) color filter wheel 39 has (see FIG. 6A) a red filter 40, a green filter 41, and a blue filter 42. Filter wheel 39 is mounted for rotation on shaft 43 and is driven by a motor 44 to sequentially move filters 40, 41 and 42 into optical path 34 in synchronism with the field frequency of the color video signal. Monochrome images displayed on screen 33 of CRT 32 are filtered by filters 40, 41 and 42 to produce color images projected to station 36 by projection lens 35.

Printer 10 also has a viewing station 45 at which an operator may view an image prior to making a print. Viewing station 45 includes a second (viewer) filter wheel 46 mounted on shaft 47 and driven by motor 48. Filter wheel 46 is similar in construction to filter wheel 39 and includes respective red, green and blue filters 49, 50 and 51 (see FIG. 6B) which are sequentially movable into a second (viewer) optical path 52 from CRT 32 to viewer 24. A mirror assembly 53, which includes mirrors 54 and 55, is movable between a position (as shown in solid lines in FIG. 2) which is out of the exposure optical path 34 and a position (as shown in dashed lines in FIG. 2) intercepting optical path 34 and establishing viewer optical path 52. As noted above, cover 22 is movable between a closed position (as shown in solid lines in FIG. 2) in which the viewer 24 is covered, and an open position (as shown in dashed lines in FIG. 2), in which the viewer 24 is uncovered so that an image displayed on CRT 32 may be viewed by an operator. When cover 22 is opened, mirror assembly 53 is moved by coupling 56 into optical path 34. When cover 22 is closed, lip 22a of cover 22 contacts finger 56a of coupling 56 to move mirror assembly 53 out of optical path 34 to permit printing of the image produced by CRT 32. The construction and operation of coupling 56 and optical assembly 53 is described in greater detail in cross-referenced, copending U.S. patent application Ser. No. 776,233, entitled COLOR VIEWER FOR A COLOR VIDEO PRINTER.

Printer 10 includes a shutter 58 movable into and out of optical path 34 by means of solenoid 60. A print eject assembly includes a pusher arm 62 actuated by a solenoid 64 and a pair of processing and eject rollers 66 and 68 rotatably actuated by motor 70.

Printer 10 also includes a detector 73 for detecting when assembly 53 is out of path 34 (which indicates cover 22 is closed). Operation of printer 10 is controlled by microprocessor control 74 which includes a microprocessor (such as the INTEL 8051), programming of which is well known to those skilled in the art.

Figure 3:
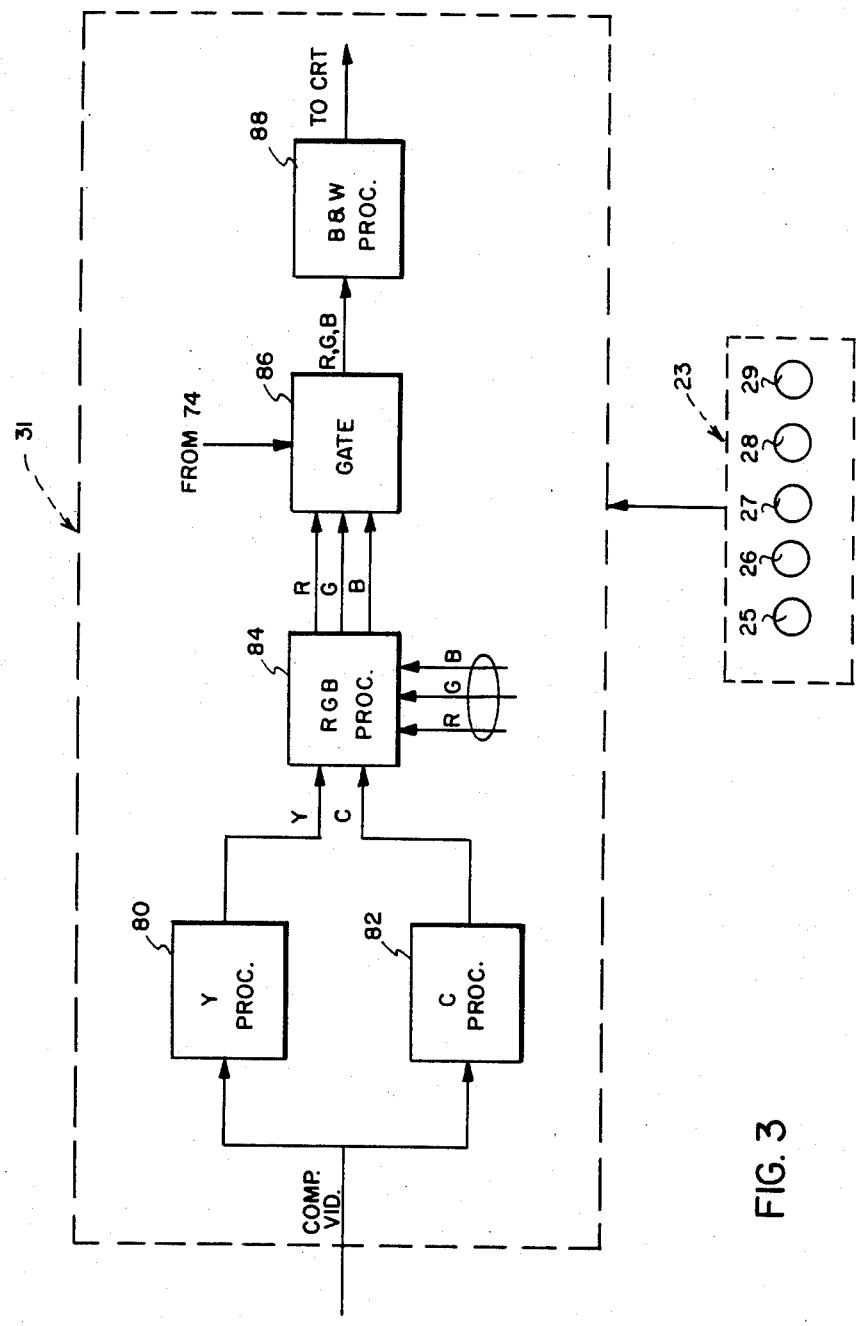
FIG. 3 is a block diagram showing in greater detail the video signal circuit shown in FIG. 2.

Video signal circuit 31 is shown in greater detail in FIG. 3. A composite color video signal received by video signal circuit 31 is applied to luminance (Y) processing circuit (Y PROC.) 80 and chrominance (C) processing circuit (C PROC.) 82. Circuits 80 and 82 respectively separate the Y and C component signals from the composite video signal. The luminance and chrominance signals are applied to RGB decode and processing circuit (RGB PROC.) 84 which decodes concurrent red (R), green (G) and blue (B) color component signals from the luminance and chrominance component signals. Circuit 84 also processes the R G B signals and applies them to gate 86. As will be described later, gate 86 is controlled by microprocessor control 74 to select one of the three concurrent R, G or B component signals applied to it. The selected color component signal is then supplied to a black and white processing circuit 88 before application to CRT 32.

The operator controls on sub-panel 23 include "COLOR" control 25 and "HUE" control 26 which respectively control the color saturation and hue of the chrominance signal processed by circuit 82; a "DETAIL" control 27 which controls the detail of the luminance signal processed by circuit 80 and respective "BLACK" and "WHITE" controls 28 and 29 which control the black and white levels of the signal processed by circuit 88 before being applied to the CRT 32.

Features of video signal circuit 31 are described in greater detail in cross-referenced, copending U.S. patent application Ser. No. 776,236, entitled WHITE COMPENSATION CIRCUIT FOR A COLOR VIDEO PRINTER and cross-referenced, copending U.S. patent application Ser. No. 776,231, entitled VIDEO SIGNAL PROCESSING CIRCUIT FOR A COLOR VIDEO PRINTER.

With reference to the flow chart of FIG. 5, control of the operation of the printer 10 by means of microprocessor control 74 will now be described. Actuation of switch 16 (FIG. 1) on front panel 12 turns printer 10 on (box 90). Control 74 turns on filter wheel motors 44 and 48 to rotate filter wheels 39 and 46, respectively. The rotational speed of wheels 39 and 46 is synchronized (box 92) with the field frequency of the color video signal processed by printer 10. Since the illustrative NTSC field frequency is sixty fields per second (fps) and filter wheels 39 and 46 have three color filters, each of wheels 39 and 46 are rotated at twenty (60 fps÷3 filters) revolutions per second. The rotational speed of wheels 39 and 46 are respectively sensed by detectors 94 and 96 (FIG. 2) detecting identifying marks 98 and 100 respectively on wheels 39 and 46. As will be described later, marks 98 and 100 also indicate the positioning of the red filters 40 and 49 in optical paths 34 and 52.

Control 74 also applies power to CRT 32 (box 102) to warm it up. After the CRT 32 is warmed up, a "READY" light 18 on panel 12 (FIG. 1) is turned on (box 104) indicating to the operator that printer 10 is ready to make a photographic copy of a color video signal.

If a copy of a video signal is to be made without any adjustments to the image characteristics thereof (such as color, hue, detail, black and white levels), the operator actuates "PRINT" switch 17 on control panel 12. Microprocessor control 74 determines whether the shutter 58 is closed (box 106), whether the rotational speed of exposure filter wheel 39 is correct (diamond 108), whether viewer cover 22 is closed (diamond 110) and whether "PRINT" switch 17 has been actuated (diamond 112). If "YES", then actuation of switch 17 effects initiation of the "print" operation. If the viewer cover 22 is open, or if the speed of filter wheel 39 is not correct or if the "PRINT" switch 17 has not been actuated, then the "print" operation will be inhibited.

Figure 6A:
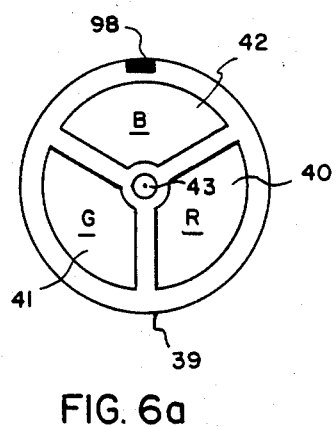
FIG. 6A and 6B are frontal views respectively of the exposure and viewer filter wheels shown in FIG. 2.
Figure 6B:
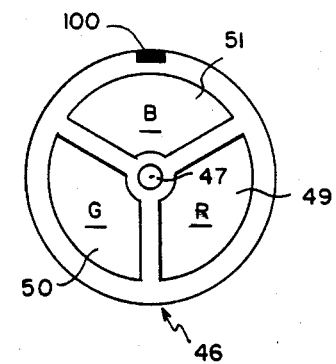

Upon initiation of the "print" operation, control 74 actuates solenoid 60 to move shutter 58 out of exposure optical path 34 (box 114). Microprocessor control 74 then determines whether the speed of filter wheel 39 is correct (diamond 116). When the mark 98 on filter wheel 39 has been detected by detector 94 to confirm that red filter 40 (FIG. 6A) of filter wheel 39 intercepts optical path 34, control 74 turns CRT 32 on (box 118) and actuates gate 86 (FIG. 3) of video signal circuit 31 to select the red component video signal to be applied to CRT 32. CRT 32 converts the video signal to a monochrome optical image on screen 33 which is converted to a red optical image by red filter 40 (FIG. 6A). The red optical image is projected along path 34 by lens 35 to exposure station 36 to expose a self-processing photographic element 38 positioned at station 36. As filter wheel 39 continues to rotate to move green filter 41 and blue filter 42 into optical path 34, control 74 actuates gate 86 to sequentially select the corresponding green and blue component video signals to be applied to CRT 32. This sequence is repeated for another sequence of red, green and blue fields. Thus, a photographic element 38 is exposed to six color field images in the sequence red, green, blue, red, green, blue field images (box 120).

Figure 4:
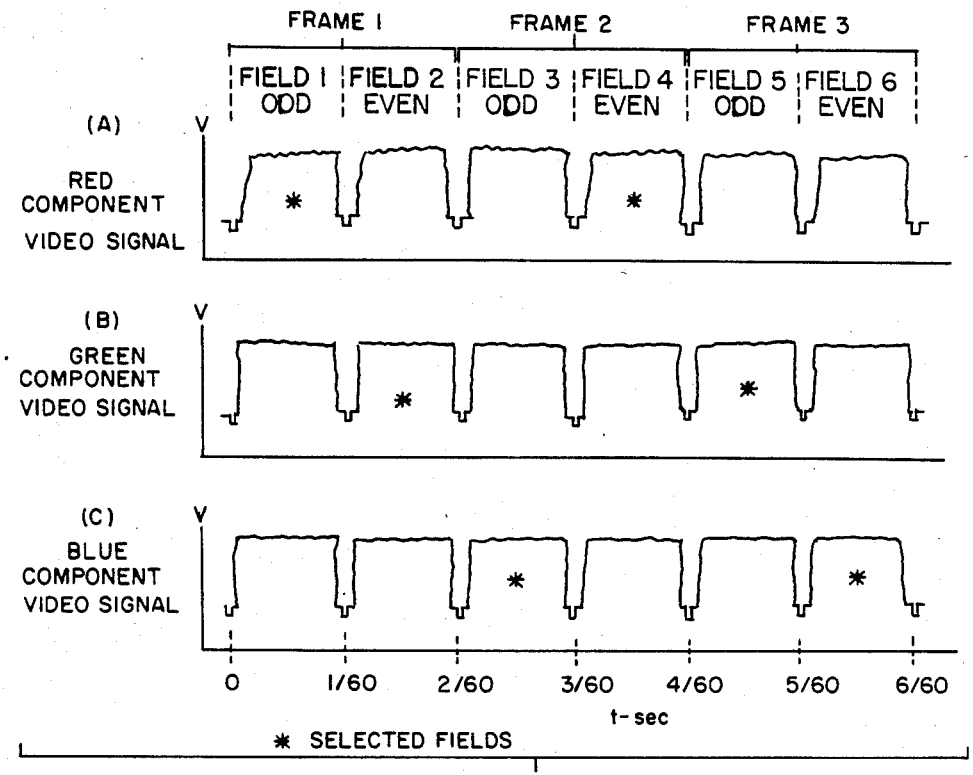
FIGS. 4A, 4B and 4C are respective video signal diagrams illustrating the operation of the printer shown in the Figures.

The sequence of exposure of element 38 is illustrated in FIG. 4. As shown, concurrent red (R), green (G) and blue (B) component video signals are applied by circuit 84 to gate 86 for a duration of three frames or six fields of color video signals. Each frame includes interlaced odd and even fields. Microprocessor control 74 is programmed to actuate gate 86 to select only one color component signal from each field of three concurrent color component signals for application to CRT 32. In FIG. 4, the selected color component signal is indicated by "*". Thus, in Field 1, the "odd" red component video signal is selected; in Field 2, the "even" green component video signal is selected, in Field 3, the "odd" blue component video signal is selected; in Field 4, the "even" red component video signal is selected, in Field 5, the "odd" green component video signal is selected; and in Field 6, the "even" blue component video signal is selected. Thus, self-processing photographic element 38 is exposed to a full resolution frame of a color video image having odd and even fields of each of red, green and blue primary colors. The exposure time of element 10 is relatively short—1/10 sec. Where the incoming color video signal represents a relatively static subject in a moving video scene, the resolution of the photographic copy is surpisingly high due to the short exposure time. Printer 10 may thus be used to make copies of television images of relatively static moving scenes.

Figure 5:
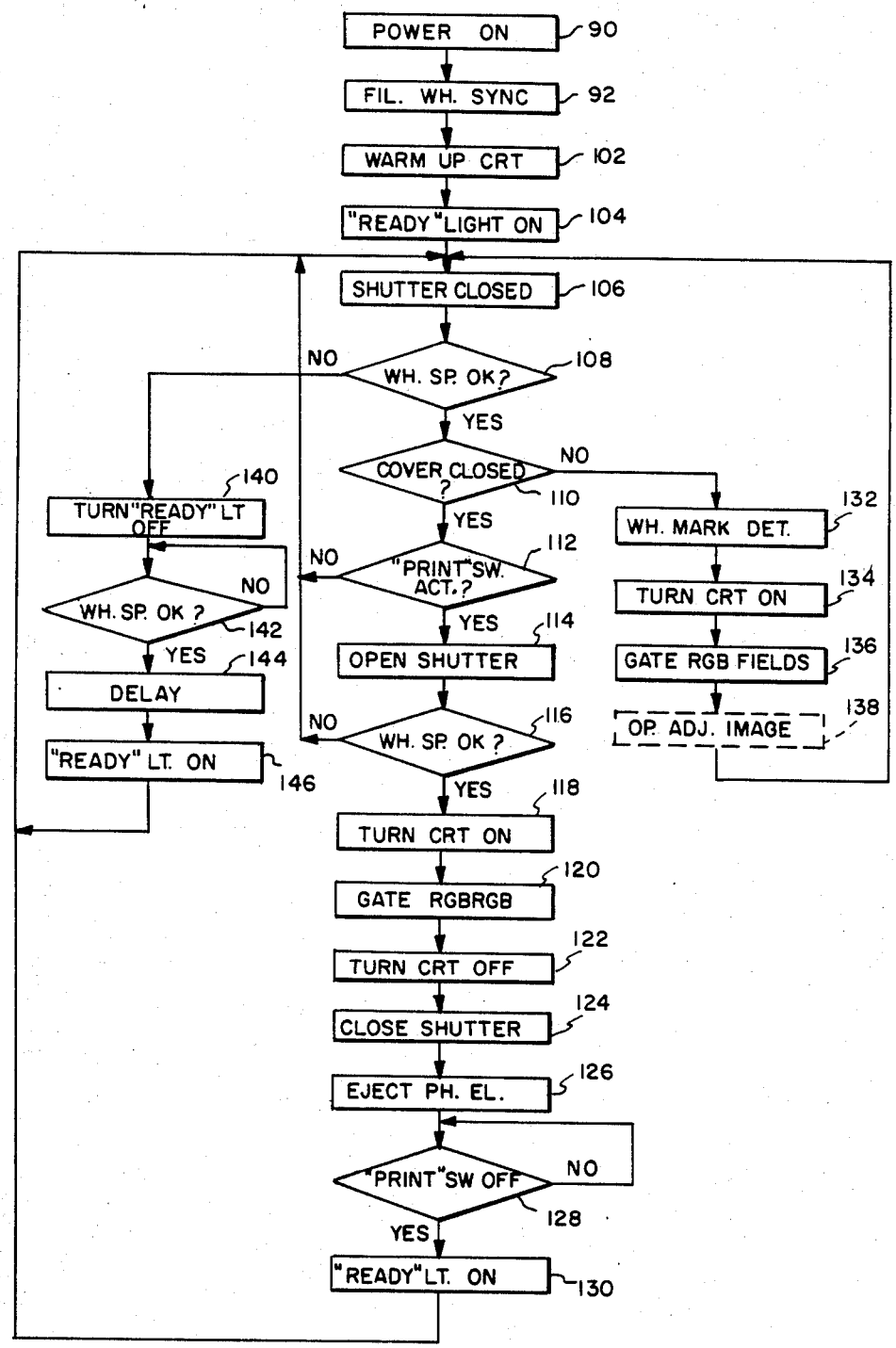
FIG. 5 is a flow chart of the operating sequence of the microprocessor control of the printer shown in the Figures.

Referring again to the flow diagram of FIG. 5, after exposure, control 74 turns off CRT 32 (box 122) and actuates solenoid 60 to close shutter 58 (box 124). Photographic element 38 is ejected from exposure station 36 (box 126) by actuation of solenoid 64 to cause pusher rod 62 to move element 38 out of pack 37 into the nip of rollers 66 and 68 (dashed lines in FIG. 2) which are rotated by motor 70. As element 38 is moved through this nip, rollers 66, 68 rupture a pod of processing chemicals made integral with element 38 and spread the chemicals uniformly over the exposed image-forming area of element 38. Element 38 self-processes to a finished photographic print outside of printer 10. A particularly exemplary photographic element which may be used in printer 10 is the "Trimprint" ® instant film pack sold by the Eastman Kodak Company, Rochester, N.Y.

After ejection of an exposed self-processing photographic element from exposure station through slot 15 in panel 12 (FIG. 1), printer 10 is ready to make another copy. After determining whether the "PRINT" switch 17 is off (diamond 128), microprocessor control 74 turns on "READY" light 18 (box 130). Spring 132 of pack 37 urges an unexposed photographic element 38 into exposure station 36. The routine is then returned to box 106 (FIG. 5).

If the operator desires to make adjustments to the characteristics of the color image to be copied, he/she opens cover 22 to gain access to viewer 24 and image controls 25–29 (FIG. 1). Optical assembly 53 is moved into optical path 34 by coupling 56 to establish viewing optical path 52 to viewer 24 (FIG. 2). Microprocessor control 74 executes the sub-routine which branches to the right (FIG. 5) of diamond 110. After detecting red filter mark 100 of the viewer filter wheel 46 (box 132), microprocessor control 74 turns on CRT 32 (box 134) and actuates gate 86 to gate through to CRT 32, repetitive sequences of red, green and blue component video signals (box 136). Since viewer filter wheel 46 is synchronized with the field frequency of the incoming color video signal, the operator views the same color image that a photographic element 38 will be exposed to. By adjusting (box 138) controls 25–29 on panel 12 (FIG. 1) the operator can change the color, hue, detail, black and white level characteristics of the color video image to be copied.

After the adjustments have been completed or if no adjustments are made, the operator closes cover 22 to move optical assembly 53 out of the exposure optical path 34. The routine of microprocessor control 74 is returned to box 106 and exposure of a photographic element may then be effected.

If it is determined at diamond 108 (FIG. 5) that the rotational speed of filter wheel 39 is not correct, control 74 executes the subroutine branching to the left. After the "READY" light 18 is turned off (box 140), microprocessor control 74 again determines whether the speed of wheel 39 is correct (diamond 142). When the speed is determined to be correct, after a delay (box 144), the "READY" light 18 is turned on (box 146) and the routine is returned to box 106.

It will be appreciated that although a particular sequence (viz., RGB) of exposure of a photographic element to primary color field images has been described above, other exposure sequences (e.g., RBG, GBR, etc.) may be effected within the scope of the present invention as long as the element is exposed to a full frame of a color video signal constituting odd and even fields of three primary color component video signals. It will also be appreciated that primary colors other than red, green and blue may be used in the practice of the present invention but that red, green and blue are the predominant primary color component signals used in present day television signal standards. Moreover, color filter wheels 39 and 46 may include more than one set of filters, in which case the speed of rotation of the wheels would be changed accordingly. For example, if each of wheels 39 and 46 had two sets of red, green and blue filters, the speed of rotation of the filters would be ten revolutions per second so that the number of filters per second moved into the optical paths still equaled the field rate of the color video signal.

The invention has been described in detail with particular reference to a preferred embodiment thereof, but it will be understood that variations and modifications can be effected within the spirit and scope of the invention.

What is claimed is:

1. Color video printer apparatus for producing a color photographic copy from a color video signal comprising:

monochrome electronic display means for displaying an image of a video signal;

an exposure station located along an optical path from said display means;

video signal circuit means for providing a color video signal constituting frames of interlaced odd and even fields repeated at broadcast field frequency, wherein each field includes three concurrent color component video signals respectively representing first, second and third primary colors of a color field image;

a continuously movable color filter having filters corresponding to said first, second and third primary colors, said primary color filters being sequentially movable into said optical path in synchronism with said field frequency of said color video signal;

selectively actuatable gate means, electrically connected between said video signal circuit means and said display means, for applying to said display means one of the three concurrent color component video signals provided by said video signal circuit means; and means for actuating said gate means in response to detection of said first primary color filter being moved into said optical path, to apply to said electronic display means a sequence of six consecutive color component video field signals constituting odd and even fields respectively of each of said first, second and third primary colors, in the color sequence of first primary color, second primary color, third primary color, first primary color, second primary color, third primary color, as respective corresponding color filters are sequentially moved into said optical path, such that said display means produces a sequence of six consecutive monochrome images which are filtered by respective corresponding primary color filters to expose a photographic element positioned at said exposure station to a sequence of six color field images constituting a full frame of a color video image.

2. The apparatus of claim 1 wherein said color filter includes (1) a rotatable filter wheel having first, second and third primary color filters and (2) means for rotating said filter wheel in synchronism with said field frequency of said color video signal.

3. The apparatus of claim 2 wherein said field frequency of said color video signal is sixty fields per second, wherein said rotating means rotates said filter wheel at twenty revolutions per second and wherein said photographic element is exposed for a duration of six fields or 1/10 second.

4. Color video printer apparatus for producing a color photographic copy from a color video signal comprising:

a monochrome cathode ray tube (CRT) for displaying an image of a video signal;

an exposure station located along an optical path from said CRT;

color video signal circuit means for providing a color video signal constituting frames of interlaced odd and even fields repeated at broadcast field frequency, wherein each field includes three concurrent color component video signals respectively representing first, second and third primary colors of a color image;

a continuously rotatable color filter wheel having first, second and third primary color filters which are sequentially movable into said optical path in synchronism with the field frequency of said color video signal;

selectively actuatable gate means, electrically connected between said video signal circuit means and said monochrome CRT, for applying to said CRT one of the three concurrent color component video signals provided by said video signal circuit means; and means for actuating said gate means, in response to detection of said first primary color filter being moved into said optical path, to apply to said CRT a sequence of six consecutive color component video field signals constituting odd and even fields respectively of each of said first, second and third primary colors, in the color sequence of first primary color, second primary color, third primary color, first primary color, second primary color, third primary color, as respective corresponding color filters are sequentially moved into said optical path, such that said CRT produced a sequence of six consecutive monochrome field images which are filtered by respective corresponding primary color filters to expose a photographic element positioned at said exposure station to a sequence of six color field images constituting a full frame of a color video image.

5. The apparatus of claim 4 wherein said video signal circuit means provides three concurrent color component video signals respectively representing red, green and blue primary colors of a color image and wherein said color filters of said filter constitute red, green and blue color filters.

6. The apparatus of claim 4 wherein said circuit means includes means for processing a composite color video field signal into three concurrent component video signals respectively representing said first, second and third primary colors.

7. The apparatus of claim 4 including means for rotating said filter wheel in synchronism with said color video signal field frequency.

8. The apparatus of claim 7 wherein said circuit means provides a color video signal having a field frequency of 60 fields per second, wherein said filter wheel rotating means rotates said filter wheel at 20 revolutions per second and wherein said said photographic element is exposed for a duration of six fields equal to 1/10 of a second.

* * * * *